Figure 1:
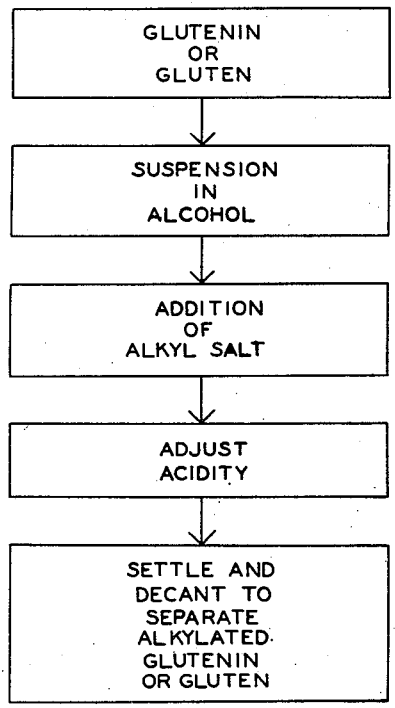

INVENTOR.
WALTER M. MILEY

United States Patent Office 2,801,236
Patented July 30, 1957

2,801,236
PROCESS OF MAKING GLUTEN DERIVATIVES

Walter M. Miley, Worthington, Ohio, assignor to National Industrial Products Company, a corporation of Ohio Application October 19, 1955, Serial No. 541,495

2 Claims. (Cl. 260—112)

The inventions disclosed in this application relate to novel wheat gluten products (particularly alkylated glutens and glutenins) and to processes for preparing them. In part, this application is a continuation of my copending application Serial No. 518,345.

I have thus discovered new products comprising alkylated glutens and glutenins; and new methods of producing them.

I have discovered that I can separate glutenin from raw undried gluten as it comes from the starch washers without the necessity of drying the gluten and that I can use this separated gluten efficiently to obtain an alkylated glutenin.

After recovery of the glutenin, I suspend or disperse it in an alcohol, mix in an alkyl salt, stir and heat, thus causing the glutenin and salt to react to form an alkylated glutenin. After reaction, I recover the alkylated glutenin as a precipitate and treat it with alkali to neutralize at least a portion of the free acid. Then I remove the alkali salt with water and acetone. In a similar manner I can react gluten (instead of glutenin) although the percentage yield is not as favorable.

OBJECTS

One of the objects of my invention is the provision of alkylated glutens and glutenins.

A further object of my invention is the provision of new processes for alkylation of glutens and glutenins.

Further objects of my invention will be apparent from the subjoined specification and claims when considered in connection with the accompanying drawings illustrating embodiments of my invention.

DRAWINGS

Figure 2:
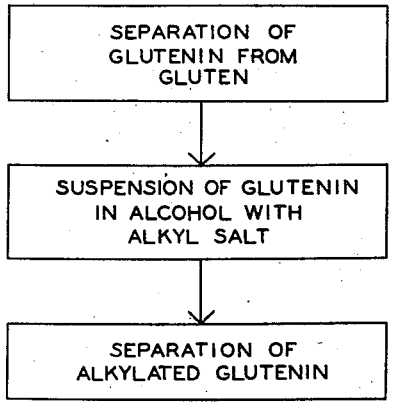

In the drawings:

Fig. 1 is a flow sheet illustrating a process of alkylating gluten or glutenin; and Fig. 2 is a flow sheet illustrating a specific combined process of producing alkylated glutenin from raw wet gluten.

ALKYLATION

I can (as illustrated in Fig. 1) alkylate either gluten or glutenin by mixing said gluten or glutenin in an alcohol and suspending or dispersing it in said alcohol and adding an alkyl salt.

As illustrated I can use either gluten or glutenin. I may also use other glutelins. I prefer to use glutenin. If gluten is used, I prefer to use wheat gum gluten (either dried or wet) although devitalized wheat gluten and other cereal glutens are also usable.

In this alkylating process, the alcohol can be anhydrous or aqueous. It can be any of the lower alcohols (e. g. 3 carbons or less) although most of my tests have been conducted in methyl alcohol and isopropyl alcohol. Ordinary commercial grades are satisfactory.

The alkyl salt can be any salt consisting of the union of a lower alkyl radical with one or more anions. My tests have been conducted mainly with methyl and ethyl chlorides, and sulfates such as:

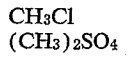  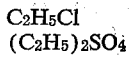

$CH_3Cl$ $\quad\quad\quad\quad$ $C_2H_5Cl$
$(CH_3)_2SO_4$ $\quad\quad\quad$ $(C_2H_5)_2SO_4$ The alkyl salt can be suspended in the alcohol prior to the mixing of the gluten or glutenin therein, or can be mixed at the same time or can be added later. The reaction takes place at room temperature but is accelerated by heating.

The proportions of the constituents are not critical although it is obvious that within limits if an insufficient quantity of the alkyl salt is provided there will be less alkylation than if more is provided. A greater quantity of salt than is necessary for the desired result is not economical. I prefer to use up to sufficient salt to alkylate the protein to the desired degree.

I prefer to remove, at least partially, the acid formed by the reaction either by washing, neutralization, etc. until the desired pH is reached.

When proceeding according to one preferred embodiment of my invention, I suspend glutenin in commercial grade methanol and add a quantity of dimethyl sulfate. If it is desirable to methylate the glutenin thoroughly, I may add a slight excess of dimethyl sulfate over the quantity theoretically necessary to methylate the glutenin to the desired degree. The amount of dimethyl sulfate required is only a fraction of the amount of the glutenin.

COMBINED PROCESS

I can also, as illustrated in Fig. 2, start with gluten (I prefer to use raw wet gluten as it comes from the starch washers) and separate the glutenin therefrom. I prefer to add such gluten to an aqueous alcohol, dispersing or suspending it therein. In so doing I usually heat and stir, thus dissolving the gliadin and decant to obtain the precipitate (i. e. glutenin). I then usually redisperse the glutenin in an alcohol; add an alkyl salt; and heat. While this process is usually in some respects similar to that illustrated in Fig. 1, in other respects it differs therefrom. Gluten is always used as the starting material in this process of Fig. 2 and by the first three or four steps the glutenin is separated therefrom. Then it is reacted (usually by a process identical with that of Fig. 1) to form a glutenin alkylate.

The raw wet gluten may be dispersed in an aqueous solution of any of the lower alcohols (e. g. methyl, ethyl, n-propyl, isopropyl or any of the butyls). In order to insure its dispersal, I can add a weak acid such as acetic, citric, formic, etc. or preferably I add $CO_2$ under pressure. If desired, the gluten can be dispersed first in water by use of such weak acids or by use of $CO_2$ and then the dispersion mixed with the alcohol. In dispersing raw wet gluten in water, and then mixing with alcohol, the water held in the wet gluten as well as the water used to disperse it, must be considered in computing the percentage of concentration of the alcohol, inasmuch as the water-alcohol mixture must be controlled within the known limits in order to precipitate the glutenin while holding the gliadin in solution and thus to separate the gliadin from the glutenin.

As stated above the concentration of the alcohol used for the solution and separation of the gliadin must be controlled within certain limits. If methyl alcohol is used it must be in effect a 40% to 75% aqueous mixture. If ethyl alcohol is used it must be in effect a 45% to 80% aqueous mixture. If one of the propyl alcohols is used it must be in effect a 45%–80% aqueous mixture. If a butyl alcohol is used it must be in effect a 50% to 85% aqueous mixture.

No large amount of heat is required to dissolve the gliadin. It will dissolve at room temperature with sufficient time and with stirring. However, I prefer to heat to from about 35° to 70° C. thus accelerating the solution.

The time required for solution of the gliadin depends on the temperature. I prefer to stir for 20–30 minutes at 30° C.; allow to settle for about 15 minutes; remove the supernatant; add additional aqueous alcohol; stir 20–30 minutes at 35° C.; allow to settle for about 15 minutes and again remove the supernatant thus performing the stirring, heating, settling, decantation cycle three of four times. However, good results are possible with a single cycle if amounts of solvent, temperatures and times are increased. I prefer the three cycle process because thereby a purer product is obtained.

The alkyl salts usable in the process illustrated in Fig. 2 are the same as the salts discussed in connection with the process of Fig. 1. The alkylation will occur at room temperature, but I prefer to heat to a higher, but relatively low temperature such as to approximately 40° C. in order to accelerate the alkylation reaction.

The following examples demonstrate the processes of this invention using particular materials, steps and conditions. It is to be understood that these examples are furnished only by way of illustration and are not intended to be by way of limitation. The viscosity measurements in all of the following examples were made with the use of a two percent aqueous solution. Measurements of water absorption were made by dissolving 1 gram of the alkylated product in a large excess of water, pouring into a graduate, allowing the solution to settle and measuring the amount of gel.

Example I

I suspended 50 grams of dry undenatured wheat gluten in one liter of commercial methanol (pure) and then added and mixed 20 grams of dimethyl sulfate. I heated this to 40° C. and with constant stirring maintained the suspension at that temperature for four hours. I then filtered the gluten product (which was a methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of methylated gluten weighing approximately 37% of the weight of the original gluten, such gluten product being highly methylated. It had a viscosity of 27,000 centipoises. It had water absorptive qualities of 110 parts of water to one of the gluten product.

Example II

I suspended 50 grams of dry undenatured wheat glutenin (separated from undenatured gluten) in one liter of commercial methanol (pure) and then added and mixed 20 grams of dimethyl sulfate. I heated this to 40° C. and maintained the suspension at that temperature for four hours. I then filtered the glutenin product (which was a methylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 86% of the weight of the original glutenin, such glutenin product being highly methylated. It had a viscosity of 50,000 centipoises. It had water absorptive qualities of 180 parts of water to one of the glutenin product.

Example III

I suspended 50 grams of dry undenatured wheat gluten in one liter of commercial methanol (pure) and then added and mixed 20 grams of dimethyl sulfate. I maintained the suspension at room temperature overnight with constant stirring. I then filtered the gluten product (which was a methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of gluten product weighing about 37% of the weight of the original gluten, such gluten product being highly methylated. It has a viscosity of 28,000 centipoises. It had high water absorptive qualities.

Example IV

I suspended 50 grams of dry undenatured wheat gluten in one liter of commercial methanol (pure) and then added and mixed 20 grams of dimethyl sulfate. I heated this to 40° C. and with constant stirring maintained the suspension at that temperature for six hours. I then filtered the gluten product (which was a methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of gluten product weighing approximately 40% of the weight of the original gluten, such gluten product being highly methylated. This had a viscosity of 28,000 centipoises. It had high water absorptive qualities.

Example V

I suspended 50 grams of dry undenatured wheat glutenin (separated from undenatured gluten) in one liter of commercial methanol (pure) and then added and mixed 20 grams of dimethyl sulfate. I heated this to 40° C. and maintained the suspension at that temperature for six hours. I then filtered the glutenin product (which was a methylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 88% of the weight of the original glutenin, such glutenin product being highly methylated. It has a viscosity of 54,000 centipoises. It had water absorptive qualities of 200 parts of water to one of the alkylated product.

Example VI

I suspended 50 grams of dry undenatured wheat glutenin (separated from undenatured gluten) in one liter of commercial methanol (pure) and then added and mixed 20 grams of dimethyl sulfate. I maintained the suspension at room temperature overnight with constant stirring. I then filtered the glutenin product (methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 81% of the weight of the original glutenin, such glutenin product being highly methylated. It had a viscosity of 25,000 centipoises. It had water absorptive qualities of 100 parts of water to 1 part of the alkylated product.

*Example VII*

I suspended 50 grams of dry glutenin (separated from undenatured wheat gluten) in one liter of commercial methanol (pure) and then added 300 grams of methyl chloride. I heated this to 40° C. and maintained the suspension at that temperature for six hours. I then filtered the glutenin product (i. e. methylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 85% of the weight of the original glutenin such glutenin product being highly methylated. It had a viscosity of 30,000 centipoises. It had high water absorptive qualities.

*Example VIII*

I suspended 50 grams of dry glutenin (separated from undenatured wheat gluten) in one liter of commercial methanol (pure) and then added 200 grams of ethyl chloride. I heated to a temperature of 40° C. and maintained the suspension at that temperature for six hours. I then filtered the glutenin product (i. e. ethylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 87% of the weight of the original glutenin, such glutenin product being highly methylated. It had a viscosity of 20,000 centipoises. It had high water absorptive qualities.

*Example IX*

I suspended 50 grams of raw wet undenatured wheat gluten in one liter of commercial methanol (pure) and then added and mixed 20 grams of dimethyl sulfate. I heated this to 40° C. and with constant stirring maintained the suspension at that temperature for six hours. I then filtered the gluten product (i. e. methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled, and decanted. I repeated the acetone solution washing, stirring, settling, and decanting process until the washings were essentially free of sulfate salts. Then I dehydrated with 100% acetone and dried. I recovered a yield of a gluten product weighing approximately 40% of the weight of the original gluten, such gluten product being highly methylated. This had a viscosity of 6,000 centipoises. It had higher water absorptive qualities.

*Example X*

I suspended 50 grams of dry denatured wheat gluten in one liter of commercial methanol (pure) and then added and mixed 20 grams of dimethyl sulfate. I heated this to 40° C. and maintained the suspension at that temperature for six hours with constant stirring. I then filtered the gluten product (i. e. methylated gluten) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of gluten product weighing about 40% of the weight of the original gluten, such gluten product being highly methylated. It had a viscosity of 10,000 centipoises. It had high water absorptive qualities.

*Example XI*

I suspended 50 grams of dry undenatured wheat glutenin (separated from undenatured gluten) in one liter of commercial ethanol (denatured) and then added and mixed 20 grams of dimethyl sulfate. I heated this to 40° C. and maintained the suspension at that temperature for six hours. I then filtered the glutenin product (i. e. methylated glutenin) from the alcohol, washed with fresh alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 80% of the weight of the original glutenin, such glutenin product being highly methylated. It had a viscosity of 7,000 centipoises. It had high water absorptive qualities.

*Example XII*

I suspended 50 grams of dry undenatured wheat glutenin (separated from undenatured gluten) in one liter of commercial isopropanol and then added and mixed 20 grams of dimethyl sulfate. I heated this to 40° C. and maintained the suspension at that temperature for six hours. I then filtered the glutenin product (i. e. methylated glutenin) from the alcohol, washed with fresh isopropyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 85% of the weight of the original glutenin, such glutenin product being highly methylated. It had a viscosity of 6,000 centipoises. It had high water absorptive qualities.

*Example XIII*

I suspended 50 grams of dry undenatured wheat glutenin (separated from undenatured gluten) in one liter of n-propanol and then added and mixed 20 grams of dimethyl sulfate. I heated this to 40° C. and maintained the suspension at that temperature for six hours with constant stirring. I then filtered the glutenin product (i. e. methylated glutenin) from the alcohol, washed with fresh propyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 80% of the weight of the original glutenin, such glutenin product being highly methylated. It had a viscosity of 5,000 centipoises. It had high water absorptive qualities of 75 parts of water to 1 part of the alkylated glutenin.

*Example XIV*

I suspended 50 grams of dry undenatured wheat glutenin (separated from undenatured gluten) in one liter of commercial methanol (pure) and then added and mixed 20 grams of dimethyl sulfate. I heated this to 40° C. and maintained the suspension at that temperature for four hours. I then filtered the glutenin product (which was a methylated glutenin) from the alcohol, washed with fresh methyl alcohol and rinsed with acetone. I then suspended the product in water and added sufficient acetone to give a 70% acetone water solution. I stirred, settled and decanted. I repeated the acetone solution washing, stirring, settling, and decanting process until the washings were essentially free from sulfate salts and the pH was increased to 3.0. Then I dehydrated with 100% acetone and dried. I recovered a yield of glutenin product weighing about 85% of the original glutenin, such glutenin product being highly methylated. It had a viscosity of 50,000 centipoises. It had high water absorptive qualities although no quantitative tests were run thereon.

*Example XV*

I ground and mixed 15 lbs. of raw wet wheat gluten in 2 gallons of city water. I dispersed the gluten by stirring, while maintaining carbon dioxide at a pressure of 30 p. s. i. above the mixture. I then allowed the precipitate to settle and poured off as much water as possible (approximately 2 gallons). I added 10 gallons of mixture of 70% isopropanol and 30% water to the precipitate, the mixture having been preheated to 35° C. I stirred for 2 hours maintaining the temperature at 35° C. I then allowed to settle for an hour, removed the supernatant and saved it for recovery of the gliadin. I suspended the precipitate in 25 gallons of commercial methanol (pure) and then added 5 lbs. of dimethyl sulfate. I heated this to 40° C. and maintained the suspension at that temperature for six hours. I then filtered the glutenin product (i. e. methylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 86% of the amount of the weight of the glutenin obtained in the separation, such glutenin product being highly methylated. It had a viscosity of 14,000 centipoises. It had high water absorptive qualities.

*Example XVI*

I mixed 15 lbs. of raw wet wheat gluten in 10 gallons of 70% isopropanol. I dispersed the gluten by stirring, while maintaining carbon dioxide at a pressure of 30 p. s. i. above the mixture. I stirred for 2 hours maintaining the temperature at 35° C. I then allowed to settle for an hour, removed the supernatant and saved it for recovery of the gliadin. I suspended the precipitate in 25 gallons of commercial methanol (pure) and then added 5 lbs. of dimethyl sulfate. I heated this to 40° C. and maintained the suspension at that temperature for six hours. I then filtered the glutenin product (i. e. methylated glutenin) from the alcohol, washed with fresh methyl alcohol, and rinsed with acetone. I then suspended the product in water and adjusted the pH to 3.5 with alkali and added sufficient acetone to give a 70% acetone water solution. I stirred, settled and decanted. I repeated the acetone solution washing, stirring, settling, and decanting process until the washings were essentially free of sulfate salts. Then I dehydrated with 100% acetone and dried. I recovered a yield of glutenin product weighing about 86% of the weight of the glutenin obtained in the separation, such glutenin product being highly methylated. It had a viscosity of 14,000 centipoises. It had high water absorptive qualities.

As explained in my copending application Serial No. 518,345 I can also alkylate (e. g. methylate) gluten or glutenin by suspending in a lower alcohol (e. g. methanol, ethanol or isopropanol) with a catalyst such as hydrochloric acid.

I have also discovered that if prior to alkylation (1) I oxidize the gluten or glutenin, (2) I deaminize the gluten or glutenin, or (3) I deaminize and then oxidize the gluten or glutenin; the product obtained on alkylation is in some respects superior to my other alkylated products.

UTILITY

My final products are useful in the carrying and holding of proportionately large amounts of water and alcohol. They are useful especially as fillers in food products. They will stabilize oil-in-water dispersions.

It is to be understood that the above described embodiments of my invention are for the purpose of illustration only and various changes may be made therein without departing from the spirit and scope of my invention.

I claim:

1. A process of preparing an alkylated glutenin which comprises dispersing raw wet gum gluten in water with $CO_2$; adding an alcohol; allowing the solids to settle; removing the supernatant liquid; mixing the precipitate with an alcohol while heating and agitating; adding dimethyl sulfate while continuing to heat and agitate; allowing the solids to settle; decanting the supernatant liquid; and recovering the precipitate as an alkylated glutenin.

2. A process of preparing an alkylated glutenin which comprises dispersing raw wet gum gluten in aqueous alcohol with $CO_2$; allowing the solids to settle; removing the supernatant liquid; mixing the precipitate with an alcohol while heating and agitating; adding dimethyl sulfate while continuing to heat and agitate; allowing the solids to settle; decanting the supernatant liquid; and recovering the precipitate as an alkylated glutenin.

References Cited in the file of this patent

UNITED STATES PATENTS

| | | |
|---|---|---|
| 2,414,195 | Evans et al. | Jan. 14, 1947 |
| 2,567,980 | Tuomy et al. | Sept. 18, 1951 |

OTHER REFERENCES

Winteringham et al.; Chem. Abst., vol. 40, cols. 5849–50 (1940).

Lewis et al.: Chem. Abst., vol. 40, col. 5850 (1940).

Blackburn et al.: Biochem. J., vol. 35 pp. 627–38 (1941).

Fraenkel-Conrat et al.: J. Biol. Chem., vol. 161, pp. 259–62 (1945).

Anson et al.: "Advances in Prot. Chem.," vol. II, pp. 339–51 (1945).

Anson et al.: "Advances in Prot. Chem.," vol. III, pp. 184–5 (1947).

Olcott et al.: Chem. Reviews, vol. of August 1947, pp. 174–5 (1947).